US009626114B2

(12) United States Patent
Li et al.

(10) Patent No.: US 9,626,114 B2
(45) Date of Patent: Apr. 18, 2017

(54) MONITORING OF EXCESSIVE WRITE OPERATIONS ISSUED TO A NON-VOLATILE MEMORY

(71) Applicant: Apple Inc., Cupertino, CA (US)

(72) Inventors: Li Li, Los Altos, CA (US); Ben-Heng Juang, Milpitas, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/682,037

(22) Filed: Apr. 8, 2015

(65) Prior Publication Data
US 2015/0212745 A1    Jul. 30, 2015

Related U.S. Application Data

(62) Division of application No. 13/762,108, filed on Feb. 7, 2013, now Pat. No. 9,026,720.

(51) Int. Cl.
*G06F 12/00* (2006.01)
*G06F 3/06* (2006.01)
(Continued)

(52) U.S. Cl.
CPC .......... *G06F 3/0617* (2013.01); *G06F 3/0622* (2013.01); *G06F 3/0637* (2013.01);
(Continued)

(58) Field of Classification Search
None
See application file for complete search history.

(56) References Cited

U.S. PATENT DOCUMENTS 6,457,142 B1 * 9/2002 Klemm ............... G06F 11/3476
714/38.12
7,882,313 B2    2/2011 Rikitake
(Continued)

FOREIGN PATENT DOCUMENTS

JP        2004288358 A    10/2004
KR    102012006700        6/2012
(Continued)

OTHER PUBLICATIONS

Taiwanese Patent Application No. 102148020 (Office Action dated May 11, 2015).
(Continued)

*Primary Examiner* — Reginald Bragdon
*Assistant Examiner* — Michael Westbrook
(74) *Attorney, Agent, or Firm* — Downey Brand LLP

(57) ABSTRACT

The invention provides a technique for managing write operations issued to a non-volatile memory included in a wireless device. A monitor software application executes on the wireless device and is configured to determine that a number of write operations issued to the non-volatile memory is greater than or equal to a write operation threshold associated with the non-volatile memory. In response, at least one application is isolated as the application responsible for issuing excessive write operations. The isolation can be carried out locally on the wireless device, or the isolation can be carried out remotely at a server by sending information about the write operations to the server. The monitor then limits additional write operations from being issued to the non-volatile memory so as to protect the non-volatile memory from becoming corrupted or inoperable.

20 Claims, 5 Drawing Sheets

(51) Int. Cl.
*G06F 12/02* (2006.01)
*G06F 11/34* (2006.01)
*H04W 8/24* (2009.01)

(52) U.S. Cl.
CPC .......... *G06F 3/0653* (2013.01); *G06F 3/0679* (2013.01); *G06F 11/3466* (2013.01); *G06F 12/0246* (2013.01); *H04W 8/245* (2013.01)

(56) References Cited

U.S. PATENT DOCUMENTS

| | | | |
|---|---|---|---|
| 8,006,246 B2 | 8/2011 | Kwon | |
| 8,332,825 B2 | 12/2012 | Mital et al. | |
| 8,566,506 B2 | 10/2013 | Locasio et al. | |
| 8,806,647 B1 | 8/2014 | Daswani et al. | |
| 2002/0169947 A1 | 11/2002 | Bilardi et al. | |
| 2005/0108075 A1* | 5/2005 | Douglis et al. | 705/8 |
| 2005/0198032 A1 | 9/2005 | Cochran | |
| 2007/0101337 A1* | 5/2007 | Gunther | G06F 9/485 718/102 |
| 2007/0180328 A1* | 8/2007 | Cornwell et al. | 714/42 |
| 2007/0198980 A1* | 8/2007 | Kwon | 718/100 |
| 2008/0089162 A1* | 4/2008 | Makela | G01P 15/0891 365/228 |
| 2008/0155184 A1 | 6/2008 | Gorobets et al. | |
| 2009/0164534 A1* | 6/2009 | Mercer | 707/205 |
| 2010/0023675 A1 | 1/2010 | Chen et al. | |
| 2011/0173412 A1 | 7/2011 | Tabei et al. | |
| 2011/0202690 A1 | 8/2011 | Chu et al. | |
| 2012/0185638 A1 | 7/2012 | Schreiber et al. | |
| 2012/0255008 A1 | 10/2012 | Yang et al. | |
| 2013/0159797 A1* | 6/2013 | Peng et al. | 714/718 |
| 2013/0332417 A1* | 12/2013 | Kim | G06F 17/30115 707/613 |
| 2014/0025869 A1 | 1/2014 | Veneroso et al. | |

FOREIGN PATENT DOCUMENTS

| | | |
|---|---|---|
| TW | 201005745 | 2/2010 |
| TW | 201128397 | 8/2011 |
| TW | 201234380 | 8/2012 |

OTHER PUBLICATIONS

Kim, et al., "Revisiting Storage for Smartphones" NEC Laborato NEC Laboratories America, Nov. 2012 pp. 1-14.
PCT/US2013/074181. Int'l Search Report & Written Opinion (Apr. 1, 2014).

* cited by examiner

MONITORING OF EXCESSIVE WRITE OPERATIONS ISSUED TO A NON-VOLATILE MEMORY

CROSS-REFERENCE TO RELATED APPLICATIONS

This application is a divisional of U.S. application Ser. No. 13/762,108, filed Feb. 7, 2013, entitled "NON-VOLATILE MEMORY MONITORING," the contents of which are incorporated herein by reference in their entirety for all purposes.

TECHNICAL FIELD

The present invention relates generally to wireless devices. More particularly, present embodiments of the invention relate to a method and system for preventing excessive write operations from corrupting or rendering inoperable a non-volatile memory included in a wireless device.

BACKGROUND

Wireless networks and wireless devices continue to evolve as new communication technologies are developed. As is commonly understood, current wireless devices are configured to interface with a smart card that is either a removable smart card or an embedded smart card. In most cases, a non-volatile memory is included in the smart card and stores software applications for accessing the wireless networks. A processor included in the wireless device is configured to read the software applications out of the non-volatile memory of the smart card and load the software applications into a random access memory (RAM) included in the wireless device. The processor then executes the software applications via the RAM, which enables the wireless device to access the wireless networks.

As is well-known, high-quality non-volatile memories—such as flash memory storage cards for consumer devices (e.g., digital cameras)—are capable of undergoing a large number write operations before they are worn out, which is usually on the order of a few hundred thousand writes. However, the non-volatile memories included in smart cards typically are low-quality and have a much shorter lifespan, which can be as low as a few thousand writes. Consequently, care and attention should be paid when developing the software applications that are resident on the non-volatile memory of the smart card to ensure that they do not issue frequent write operations to the non-volatile memory when executing on the processor of the wireless device. Instead, the software applications should be configured such that any frequent write operations are issued to the RAM of the wireless device that temporarily stores the software applications during the execution thereof.

Unfortunately, however, software development is a complex process and mistakes can easily be made. For example, a software engineer may write a loop that continuously references and updates a global variable instead of a local variable. This can cause the processor to issue continuous write operations to the non-volatile memory of the smart card instead the RAM of the wireless device, and can quickly lead to corrupting or rendering inoperable the non-volatile memory of the smart card. Consequently, the wireless device is unable to access the software applications, and, in turn, is unable to access the wireless networks. The owner of the wireless device is then faced with having to either replace the smart card when the smart card is removable or dismember the wireless device when the smart card is embedded, each of which is costly and incurs significant connectivity downtime to the owner.

SUMMARY

This paper describes various embodiments that relate to preventing excessive write operations from being issued to a non-volatile memory of a smart card included in a wireless device. In particular, a processor included in the wireless device is configured to execute a monitor software application that monitors write operations that are issued to the non-volatile memory of the smart card. In general, these write operations originate from software applications that pre-loaded into the non-volatile memory of the smart card, which are read from the non-volatile memory and executed by a processor included in the wireless device. If the monitor detects that a threshold number of write operations are issued to the non-volatile memory of the smart card, then the monitor gathers information about the write operations and the issuing software applications and transmits the information to an analyzer for processing. In turn, the analyzer determines which, if any, of the software applications should be shut down or limited in order to halt the excessive write operations from being issued to the non-volatile memory of the smart card, which can help reduce or eliminate the possibility of corrupting or even rendering inoperable the non-volatile memory included in the smart card.

One embodiment of the invention sets forth a computer-implemented method for managing write operations issued to a non-volatile memory included in a wireless device. The method includes the steps of monitoring write operations issued to the non-volatile memory, wherein the write operations are issued by one or more applications executing on the wireless device, determining that a number of write operations issued to the non-volatile memory is greater than or equal to a write operation threshold, isolating, from the one or more applications, at least one application that is responsible for issuing the number of write operations that is greater than or equal to the write operation threshold, and limiting additional write operations from being issued to the non-volatile memory.

Another embodiment of the invention sets forth a computer-implemented method for managing write operations issued to a non-volatile memory included in a wireless device. The method includes the steps of receiving a message from a monitor executing on the wireless device, wherein the message includes information about a plurality of write operations issued to the non-volatile memory, determining, through parsing the plurality of write operations, that the at least one application is responsible for issuing a number of write operations greater than or equal to a threshold number of write operations associated with the non-volatile memory, and transmitting a message to the monitor, wherein the message indicates to the monitor that the monitor should limit write operations from being issued to the non-volatile memory.

Other embodiments include a wireless device and a server that are configured to carry out the method steps described above, as well as a non-transitory computer readable medium storing instructions that, when executed by a processor, cause the processor to carry out the method steps described above.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing portable computing devices. These drawings in no way limit any changes in form and detail that may be made to the invention by one skilled in the art without departing from the spirit and scope of the invention. The embodiments will be readily understood by the following detailed description in conjunction with the accompanying drawings, wherein like reference numerals designate like structural elements, and in which.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Figure 1:
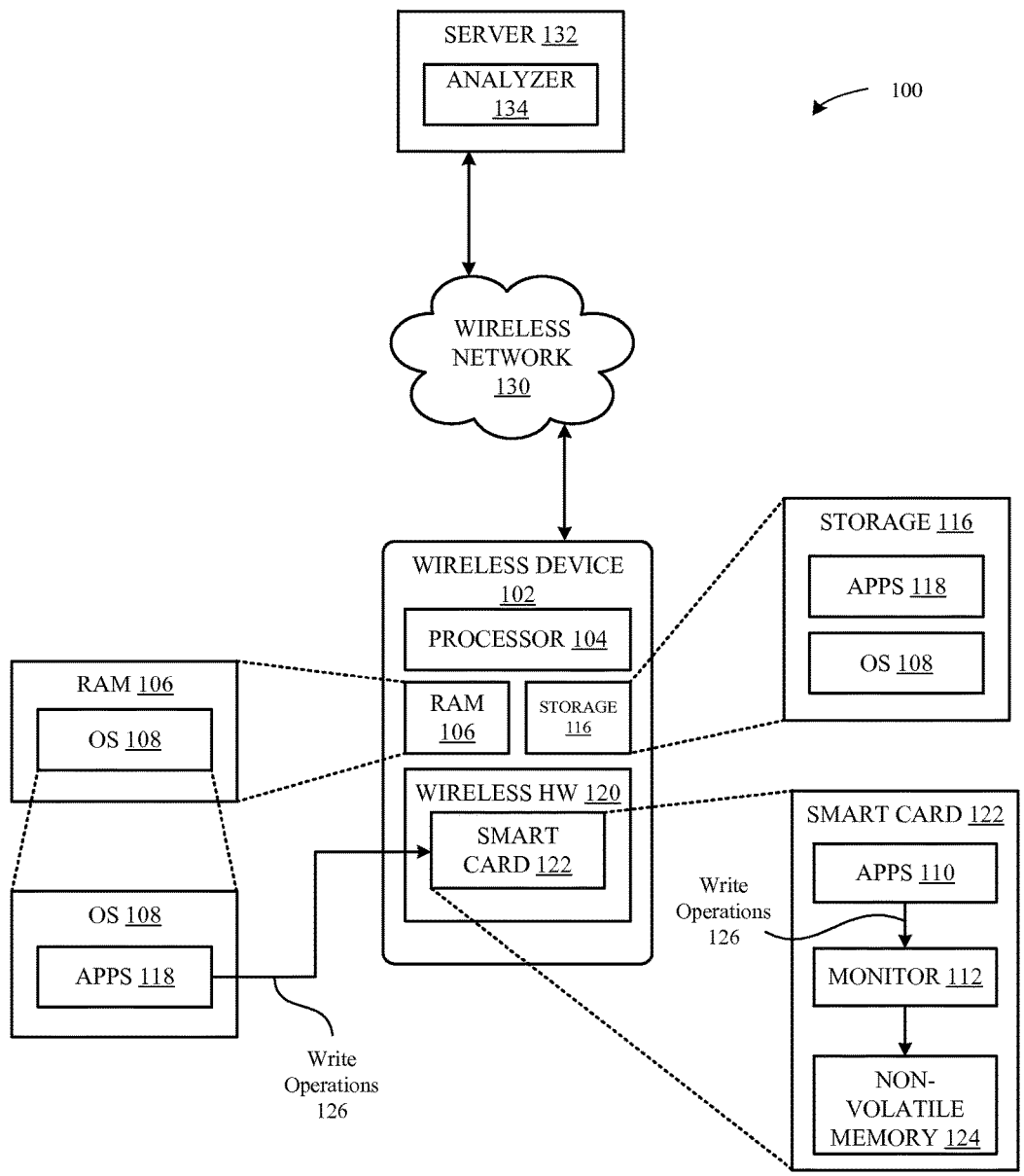
FIG. 1 illustrates a system configured to implement the various embodiments of the invention described herein.

FIG. 1 illustrates a system 100 configured to implement the various embodiments of the invention described herein. As shown in FIG. 1, the system 100 includes a wireless device 102 and a server 132 that are configured to communicate with one another via a wireless network 130, e.g., a Universal Mobile Telecommunications System (UMTS) wireless network, a Code Division Multiple Access (CDMA) wireless network, a Long Term Evolution (LTE) wireless network, or a WIFI wireless network. The internal hardware of the wireless device 102 includes various components such as a processor 104, a random access memory (RAM) 106, a storage 116 (e.g., a solid state drive (SSD)), and wireless hardware 120. As is commonly understood, the wireless hardware 120 includes various components (not all of which are illustrated) that enable the wireless device 102 to interface with the wireless network 130, e.g., radio antennas and radio processors. As shown in FIG. 1, the wireless hardware 120 can include a smart card 122, which is configurable to be integrated into the wireless device 102 or removable from the wireless device 102. The smart card 122 can also be referred to as a subscriber identity module (SIM) card for GSM and GPRS wireless networks, a universal subscriber identity module (USIM) card for a UMTS network, a CDMA subscriber identity module (CSIM) application on a removable user identity module (R-UIM) card for the a CDMA2000 1x/EV-DO wireless network, and a universal integrated circuit card (UICC) for an LTE wireless network. Herein, the smart card 122 can refer to any "smart card" that can be used in the wireless device 102.

Applications that provide services to a user of the wireless device 102 and functions required to interconnect the wireless device 102 with different types of wireless networks 130 can be resident on the smart card 122. Such applications are represented as applications 110 in FIG. 1 and are stored on a non-volatile memory 124 included in the smart card 122. Messages can be communicated between the smart card 122 and the processor 104 in the wireless device 102. The smart card 122 can also send "proactive" commands to the processor 104 in the wireless device 102 to trigger a change in behavior of the wireless device 102. The wireless device 102 can also send "envelope" commands to the smart card 122 to inform the smart card 122 of status information of the wireless device 102 and to trigger actions in the smart card 122, such as write operations to the non-volatile memory 124. A representative set of commands used for information exchange between the smart card 122 and the processor 104 in the wireless device 102 can be a UIM "toolkit" specified by a wireless communication standard published by a wireless standards organization (e.g. 3GPP) and/or by a supplier of the smart card 122 (e.g., Gemalto) and/or by a wireless network 130 operator (e.g., AT&T) that provides software/firmware in the smart card 122. In the case where the smart card 122 is supplied in the wireless device 102 upon purchase, the smart card 122 can include software/firmware that is specific to one or more wireless network operators; however, additional information can also be added upon an initial provisioning of the smart card 122 with the wireless network 130.

In the illustration of FIG. 1, the processor 104 is under the control of an operating system (OS) 108 that is configured to execute on the wireless device 102, such as Apple's iOS operating system. In particular, the OS 108 is configured to load into the RAM 106 one or more applications 118 that are resident on the wireless device 102 and stored in the storage 116. As previously noted herein, in some cases, an application—such as an application 110 included in the smart card 122, or an application 118—may, through poor programming techniques, issue an excessive number of write commands to the non-volatile memory 124 (illustrated as write operations 126) and compromise the lifespan of the non-volatile memory 124. In attempt to mitigate this problem, the smart card 122 is configured to include a monitor 112 that monitors (illustrated in FIG. 2 as analysis 128) write operations issued to the non-volatile memory 124. As described in greater detail below, the monitor 112 is configured to determine a point at which an excessive number of write commands have been issued to the non-volatile memory 124 by the applications 110/118. Upon such a determination, the monitor transmits to the server 132 information about the write commands for processing by the server 132. An analyzer 134 executing on the server 132 receives the transmitted information and determines which, if any, of the applications 110/118 are responsible for the excessive write operations and need to be shut down on the wireless device 102 to prevent the non-volatile memory 124 from being damaged. Under a scenario where the analyzer 134 determines that at least one application 110/118 needs to be shut down on the wireless device 102, the analyzer 134 transmits shut down instructions back to the monitor 112, whereupon the monitor 112 shuts down the at least one application 110/118.

Notably, although the analyzer 134 is illustrated and described herein as a software application that is configured to execute on the server 132, the invention is not so limited. In particular, the analyzer 134 may execute locally on the wireless device 102 via the processor 104, where the analyzer 134 is configured to interface with the monitor 112 to implement the various techniques described herein.

Figure 2:
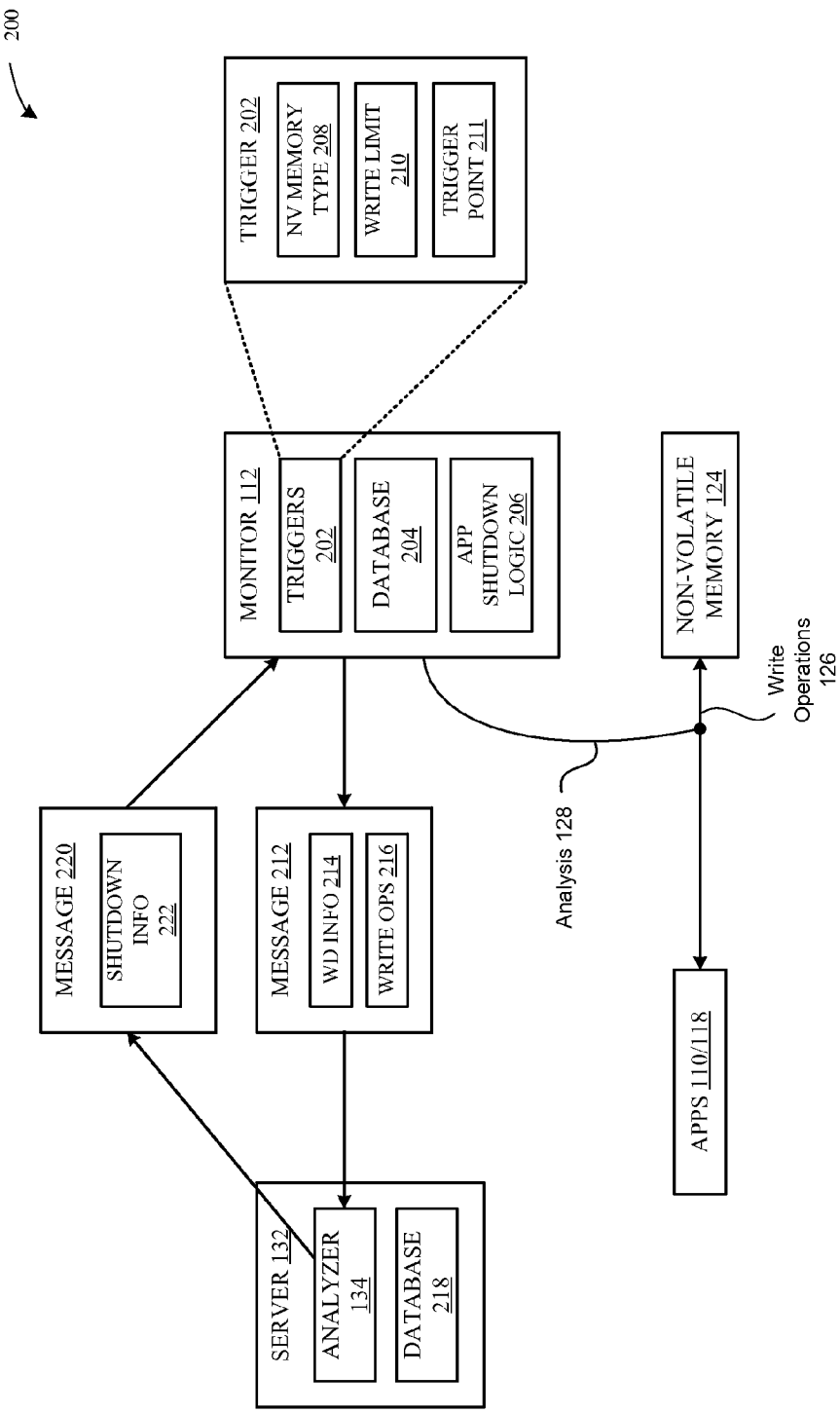
FIG. 2 illustrates a detailed view of the system of FIG. 1, according to one embodiment of the invention.

FIG. 2 illustrates a more detailed view 200 of the system 100 of FIG. 1, according to one embodiment of the invention. As shown in FIG. 2, the monitor 112 includes triggers 202, a database 204, and application shut down logic 206. In one embodiment, each trigger 202 is implemented as a data object and includes information about 1) the type of non-volatile memory 124 included the smart card 122 (via a non-volatile memory type property 208), 2) information about a write limit associated with the non-volatile memory 124 (via a write limit property 210), and 3) a trigger point that is fixed or calculated and used by the monitor 112 to determine a point at which a notification should be sent to the analyzer 134 executing on the server 132 (via a trigger point 211 property). In this way, the monitor 112 can be executed on different types of wireless devices 102 and accurately determine if and when the non-volatile memories 124 included in the smart cards 122 of the wireless devices 102 are being compromised. For example, one trigger 202 may specify that a particular non-volatile memory 124 (i.e., non-volatile memory type property 208) has an estimated lifecycle of ten thousand write operations (i.e., write limit property 210) and that the monitor 112 should notify the analyzer 134 when one thousand write operations in total have been issued to the non-volatile memory 124 (i.e., trigger point 211). Alternatively, a trigger 202 can indicate to the monitor 112 that the analyzer 134 should be notified when a rate at which write operations are being issued to the non-volatile memory 124 is exceeded, e.g., when more than thirty write operations per minute are being issued to the non-volatile memory 124.

As also shown in FIG. 2, the monitor 112 includes a database 204, which is used by monitor 112 to track information about write operations that are issued to the non-volatile memory 124. In this way, the monitor 112 is capable of determining when a trigger point 211 that is associated with the non-volatile memory 124 has been reached. The database 204 also enables the monitor 112 to track detailed data about the write operations issued to the non-volatile memory 124, such as identifiers for the applications 110/118 that issue the write operations, timestamps associated with the write operations, target memory addresses specified by the write operations, data included in the bodies of the write operations, and the like. As described in further detail below, this detailed information can be transmitted to the analyzer 134 so that the analyzer 134 can conduct meaningful analysis and accurately transmit commands, when necessary, to shut down one or more applications 110/118 executing on the wireless device 102.

As shown in FIG. 2, the detailed information is transmitted from the monitor 112 to the analyzer 134 via a message 212, which includes 1) information related to the wireless device 102 (via a wireless device info property 214), and 2) information related to the write operations issued to the non-volatile memory 124 (via a write operations information property 216). The message 212 is received by the analyzer 134, which, as shown in FIG. 2, is configured to communicate with a database 218 for storing information included in the message 212. The analyzer 134 processes the information included in the message 212, and, if the analyzer 134 determines that one or more of the applications 110/118 should be shut down, then the analyzer 134 transmits a message 220 back to the monitor 112. As shown in FIG. 2, the message 220 includes shut down information 222, which specifies the applications 110/118 that the monitor 112 is required to shut down via the application shut down logic 206. Additionally, the shut down information 222 can include any executable instructions that can be carried out by the application shutdown logic 206, e.g., locking one or more of the applications 110/118 from issuing any write operations to the non-volatile memory 124, or locking the non-volatile memory 124 altogether from receiving write operations from any application that is capable of issuing write operations to the non-volatile memory.

Additionally, and as described in further detail below, the analyzer 134 may reference data stored in the database 218 to identify other wireless devices that are executing or plan to execute (e.g., as a result of a pending software update) one or more of the applications 110/118. The monitor 112 then transmits the same or a similar message 220 to each of the identified other wireless devices so as to help prevent the non-volatile memories included therein from being compromised.

Figure 3A:
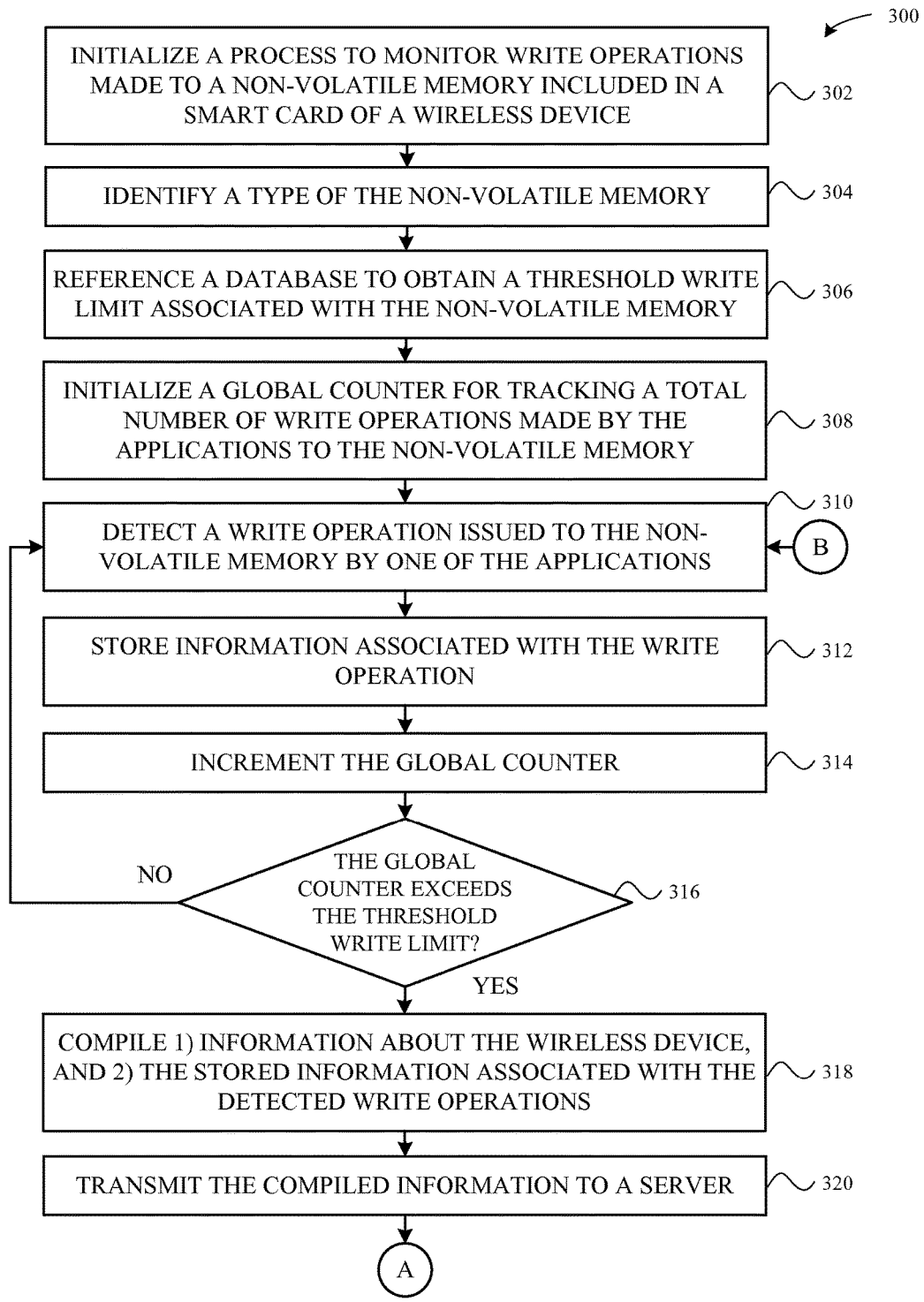
FIGS. 3A-3B illustrate a method for detecting and shutting down applications that issue excessive writes to a non-volatile memory, according to one embodiment of the invention.
Figure 3B:
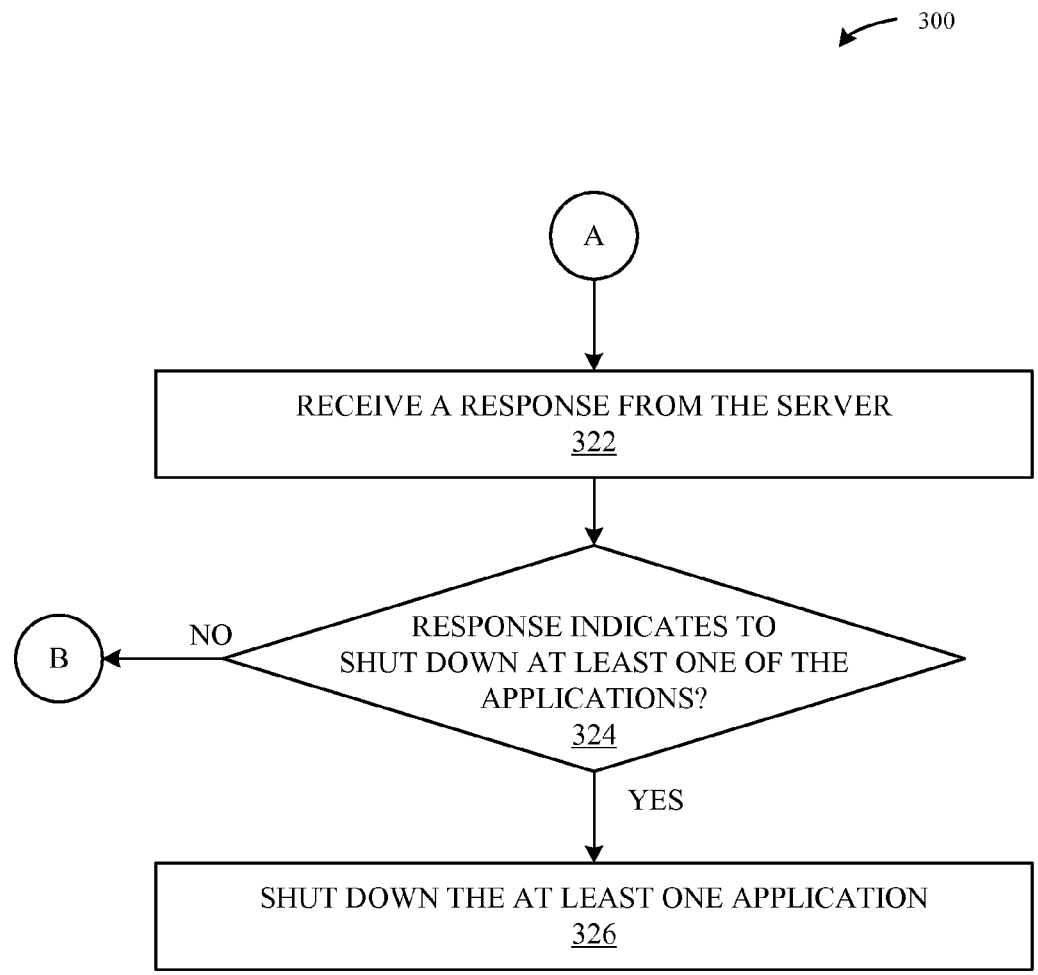

FIGS. 3A-3B illustrate a method 300 for detecting and shutting down applications that issue excessive writes to a non-volatile memory, according to one embodiment of the invention. Although the method steps are described in conjunction with the systems of FIGS. 1-2, persons skilled in the art will understand that any system configured to perform the method steps, in any order, is within the scope of the invention.

As shown in FIG. 3A, the method 300 begins at step 302, where the monitor 112 initializes a process (e.g., the monitor 112) to monitor write operations made to a non-volatile memory (e.g., the non-volatile memory 124) included in a smart card (e.g., the smart card 122) of a wireless device (e.g., the wireless device 102).

At step 304, the monitor 112 identifies a type of the non-volatile memory. In one embodiment, the type of non-volatile memory includes a manufacturer identity and a model identity, which the monitor 112 may obtain, for example, from data included in the smart card, which can be provided by the manufacturer of the smart card. At step 306, the monitor 112 references a database (e.g., the database 204) to obtain a threshold write limit associated with the non-volatile memory (e.g., a trigger 202). Continuing with the example provided above at step 304, the monitor 112 references the database and provides the manufacturer identity and model identity to the database to obtain the threshold write limit associated with the non-volatile memory. In the event that the database does not include a threshold write limit for a particular non-volatile memory, the monitor 112 can reference additional information about the non-volatile memory that is available in order to generate an estimate threshold write limit. For example, the monitor 112 can analyze manufacturing information related to the non-volatile memory—such as the type of material or the structure of the non-volatile memory—and then generate an estimated threshold write limit for the non-volatile memory.

At step 308, the monitor 112 initializes a global counter for tracking a total number of write operations made by the applications to the non-volatile memory. At step 310, the monitor 112 detects a write operation issued to the non-volatile memory by one of the applications. At step 312, the monitor 112 stores information associated with the write operation. At step 314, the monitor 112 increments the global counter. At step 316, the monitor 112 determines whether the global counter exceeds the threshold write limit.

If, at step 316, the monitor 112 determines that the global counter exceeds the threshold write limit, then the method 300 proceeds to step 318. Otherwise, the method 300 proceeds back to step 310, where the monitor 112 idles and waits to detect a next write operation issued to the non-volatile memory.

At step 318, the monitor 112 compiles 1) information about the wireless device (e.g., wireless device info 214), and 2) the stored information associated with the detected write operations (e.g., write operations information 216). As noted above, the analyzer 134 can execute locally on the wireless device 102 or remotely on the server 132. The remaining steps 320-324 describe an embodiment where the analyzer 134 executes on the server 132. However, these steps may be performed in the same manner when the analyzer 134 executes locally on the wireless device 102.

At step 320, the monitor 112 transmits the compiled information to a server (e.g., the server 132). Turning now to FIG. 3B, at step 322, the monitor 112 receives a response from the server. At step 324, the monitor 112 determines whether response indicates to shut down at least one of the applications. If, at step 324, the monitor 112 determines that response indicates to shut down at least one of the applications, then the method 300 proceeds to step 326. Otherwise, the method 300 proceeds back to step 310. At step 326, the monitor 112 shuts down the at least one application.

Figure 4:
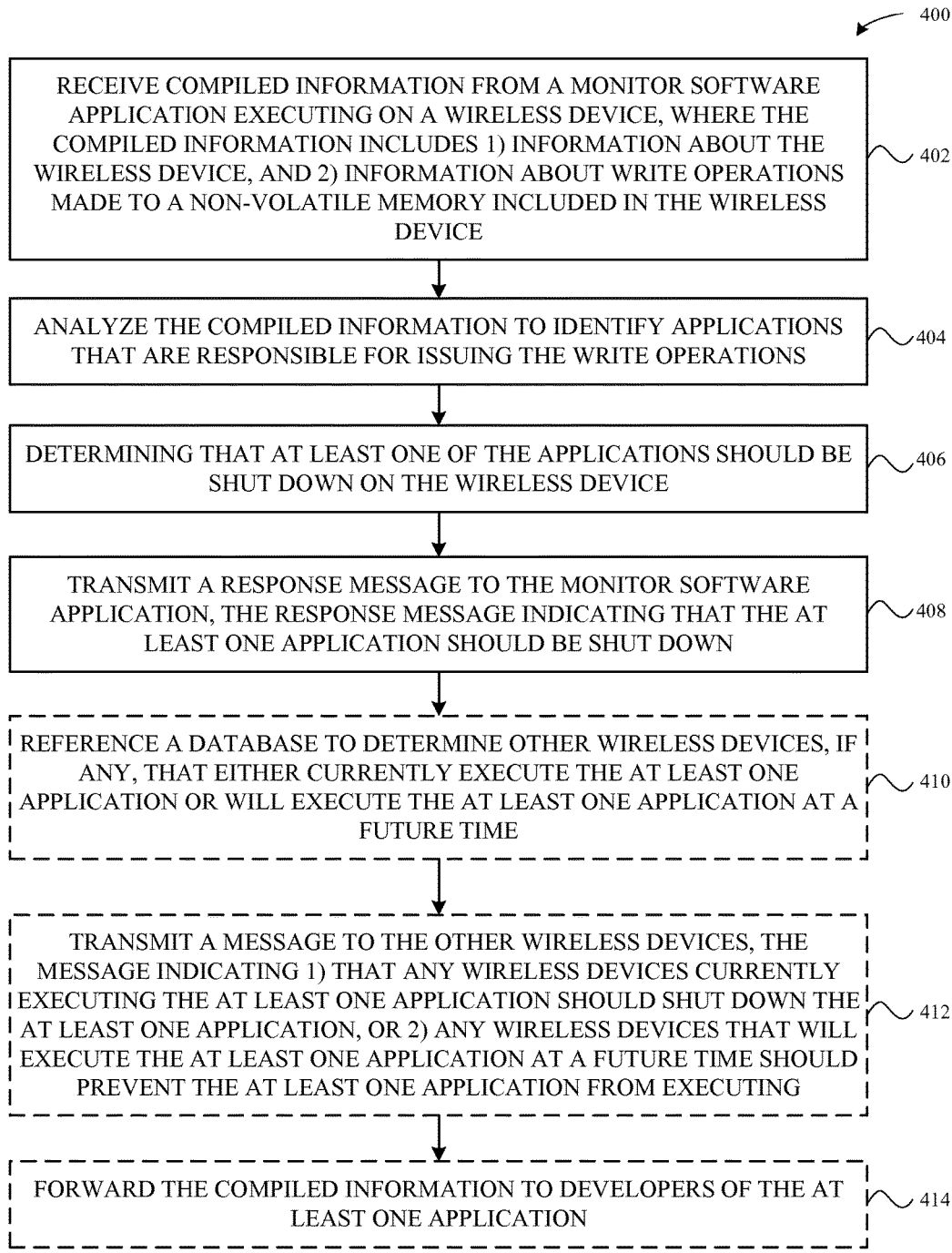
FIG. 4 illustrates a method for determining whether to shut down an application executing on one or more wireless devices, according to one embodiment of the invention.

FIG. 4 illustrates a method 400 for determining whether to shut down an application executing on one or more wireless devices, according to one embodiment of the invention. Although the method steps are described in conjunction with the systems of FIGS. 1-2, persons skilled in the art will understand that any system configured to perform the method steps, in any order, is within the scope of the invention.

As shown in FIG. 4, the method 400 begins at step 402, where the analyzer 134 receives compiled information from a monitor software application executing on a wireless device (e.g., the monitor 112 executing on the wireless device 102). The compiled information includes 1) information about the wireless device, and 2) information about write operations made to a non-volatile memory included in the wireless device.

At step 404, the analyzer 134 analyzes the compiled information to identify applications that are responsible for issuing the write operations. In one example, the analyzer 134 determines, through parsing the information related to the write operations (compiled at step 318 in FIG. 3), that two different software applications are issuing write operations to the non-volatile memory. In particular, the analyzer 134 determines that a first software application of the two software applications issued over two hundred writes to the non-volatile memory, whereas the second software application of the two software applications issued only one write to the non-volatile memory. Accordingly, the analyzer 134 would isolate the first software application as the software application that needs to be shut down within the wireless device. At step 406, the analyzer 134 determines that at least one of the applications should be shut down on the wireless device. At step 408, the analyzer 134 transmits a response message to the monitor software application, the response message indicating that the at least one application should be shut down.

At step 410, the analyzer 134 optionally references a database to determine other wireless devices, if any, that either currently execute the at least one application or will execute the at least one application at a future time. At step 412, the analyzer 134 optionally transmits a message to the other wireless devices, the message indicating 1) that any wireless devices currently executing the at least one application should shut down the at least one application, or 2) any wireless devices that will execute the at least one application at a future time should prevent the at least one application from executing.

Finally, at step 414, the analyzer 134 optionally transmits a message to developers of the at least one application. In turn, the developers can isolate the problematic code and provide a software update that eliminates the excessive write operations from being issued to the non-volatile memory. Although not illustrated in FIG. 4, the method 400 can further include steps that involve the developers issuing a verified software update to the analyzer 134, whereupon the analyzer 134 transmits the verified software update to the one or more wireless devices that are configured to execute the problematic at least one application. As a result, the features provided by the at least one software application can be restored on the one or more wireless devices without compromising the non-volatile memories of the smart cards included in the one or more wireless devices.

Although the foregoing techniques involve the monitor 112 being resident within the smart card 122, embodiments of the invention are not so limited. For example, the monitor 112 can be configured to monitor any non-volatile memory within a particular system so long as the monitor 112 is able to monitor write operations that are directed to the non-volatile memory. For example, a second instance of monitor 112 may be implemented within the wireless hardware 120 to monitor write operations that are made to one or more non-volatile memories included in the wireless hardware 120. In this manner, additional non-volatile memories included in difficult-to-replace hardware (e.g., the wireless hardware 120) can be protected from applications that intentionally or erroneously execute excessive write operations to the non-volatile memories.

In sum, embodiments of the invention provide a technique for preventing excessive write operations from being issued to a non-volatile memory included in a wireless device. A monitor software application executes on the wireless device and is configured to identify a write operation threshold associated with the non-volatile memory. The monitor software application monitors write operations issued to the non-volatile memory that are issued by one or more applications executing on the wireless device. If the monitor software determines that the write operation threshold is met or exceeded by a number of write operations issued to the non-volatile memory, then at least one application is to be isolated as the application responsible for the excessive write operations. According to one embodiment, the isolation can be carried out locally on the wireless device via the monitor; or, according to another embodiment, the isolation can be carried out remotely at a server by sending information about the write operations to the server. Finally, the monitor terminates the isolated at least one application so as to protect the non-volatile memory from becoming corrupted or inoperable as a result of excessive write operations made thereto.

One advantage provided by the embodiments of the invention is that the wireless device is able to reduce the chances of the non-volatile memory of the smart card becoming corrupted or inoperable due to excessive write operations issued by poorly-written software applications. Another advantage is that information obtained about such poorly-written software applications can be used to prevent other wireless devices from executing the poorly-written software applications, such as wireless devices that have not yet received the poorly-written software applications (e.g., through a software update). Yet another advantage is that developers of the poorly-written software applications can be immediately notified about the malicious activity of their software applications so that the developers can issue software updates that eliminate the problematic code.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

We claim:

1. A computer-implemented method for managing write operations issued to a non-volatile memory included in a wireless device, the method comprising:
at the wireless device:
monitoring one or more write operations issued to the non-volatile memory, wherein the one or more write operations are issued by a plurality of applications executing on the wireless device;
determining that a number of write operations issued to the non-volatile memory is greater than or equal to a write operation threshold;
communicating information associated with the one or more write operations to a remote server when the number of write operations is determined to be greater than or equal to the write operation threshold;
receiving a response message from the remote server, wherein the response message is received at the wireless device and at one or more additional wireless devices, and wherein the response message includes:
identifying information that identifies at least one application of the plurality of applications that is responsible for issuing the number of write operations that is greater than or equal to the write operation threshold, and is to be shut down, and
executable instructions associated with the at least one application, wherein the executable instructions are to be carried out at the wireless device; and
in response to receiving the response message, identifying the at least one application that is to be shut down:
isolating, from the plurality of applications, the at least one application that is responsible for issuing the number of write operations that is greater than or equal to the write operation threshold, and
carrying out the executable instructions obtained from the response message, wherein the executable instructions when carried out prevent the at least one application from issuing additional write operations to the non-volatile memory.

2. The computer-implemented method of claim 1, further comprising:
storing the information about each write operation of the one or more write operations that is issued to the non-volatile memory, wherein the information includes: an identifier for a particular application of the plurality of applications that issues the write operation, a timestamp associated with the write operation, a target memory address specified by the write operation, and data included in a body of the write operation.

3. The computer-implemented method of claim 1, further comprising:
compiling at least a portion of the information into a message;
populating the message with information about the wireless device; and
transmitting the message to the remote server.

4. The computer-implemented method of claim 3, wherein the response message indicates that the one or more write operations should be limited from being issued to the non-volatile memory by:
terminating the at least one application,
locking the at least one application from issuing any write operations to the non-volatile memory, or
locking the non-volatile memory from receiving write operations from any application.

5. The computer-implemented method of claim 4, wherein:
the one or more write operations are associated with at least a first application and a second application of the plurality of applications,
the information associated with the one or more write operations is parsed at the remote server to determine either the first application or the second application as the at least one application that is responsible for issuing the number of write operations that is greater than or equal to the write operation threshold, and
the response message further includes executable instructions that when carried out at the wireless device cause the non-volatile memory to be locked from receiving write operations from either the first application or the second application.

6. The computer-implemented method of claim 1, further comprising:
determining the write operation threshold associated with the non-volatile memory.

7. The computer-implemented method of claim 6, wherein determining the write operation threshold comprises:
determining the write operation threshold based on information about a write limit associated with the non-volatile memory.

8. The computer-implemented method of claim 6, wherein determining the write operation threshold comprises:
identifying a manufacturer or a type of the non-volatile memory;

communicating the manufacturer or the type of the non-volatile memory to a database, wherein the database includes information regarding write operation thresholds associated with different types of non-volatile memories;

when the database includes the write operation threshold associated with the non-volatile memory, obtaining, from the database, the write operation threshold; and when the database does not include the write operation threshold:
  generating an estimated write operation threshold based on analysis of manufacturing information associated with the non-volatile memory, and
  utilizing the estimated write operation threshold as the write operation threshold.

9. A non-transitory computer readable storage medium configured to store instructions that, when executed by at least one processor included in a wireless device, cause the wireless device to manage write operations issued to a non-volatile memory included in the wireless device, by carrying out steps that include:
  monitoring one or more write operations issued to the non-volatile memory, wherein the one or more write operations are issued by a plurality of applications executing on the wireless device;
  determining that a number of write operations issued to the non-volatile memory is greater than or equal to a write operation threshold;
  communicating information associated with the one or more write operations to a remote server when the number of write operations is determined to be greater than or equal to the write operation threshold;
  receiving a response message from the remote server, wherein the response message is received at the wireless device and at one or more additional wireless devices, and wherein the response message includes:
    identifying information that identifies at least one application of the plurality of applications that is responsible for issuing the number of write operations that is greater than or equal to the write operation threshold, and is to be shut down, and
    executable instructions associated with the at least one application, wherein the executable instructions are to be carried out at the wireless device;
  and
  in response to receiving the response message, identifying the at least one application that is to be shut down:
    isolating, from the plurality of applications, the at least one application that is responsible for issuing the number of write operations that is greater than or equal to the write operation threshold, and
    carrying out the executable instructions obtained from the response message, wherein the executable instructions when carried out prevent the at least one application from issuing additional write operations to the non-volatile memory.

10. The non-transitory computer readable storage medium of claim 9, wherein the steps further include:
  storing the information about each write operation that is issued to the non-volatile memory, wherein the information includes: an identifier for a particular application of the plurality of applications that issues the write operation, a timestamp associated with the write operation, a target memory address specified by the write operation, and data included in a body of the write operation.

11. The non-transitory computer readable storage medium of claim 9, wherein the steps further include:
  compiling at least a portion of the information into a message;
  populating the message with information about the wireless device; and
  transmitting the message to the remote server.

12. The non-transitory computer readable storage medium of claim 11, wherein the response message indicates that the one or more write operations should be limited from being issued to the non-volatile memory by:
  terminating the at least one application,
  locking the at least one application from issuing any write operations to the non-volatile memory, or
  locking the non-volatile memory from receiving write operations from any application.

13. The non-transitory computer readable storage medium of claim 9, wherein the steps further include:
  determining the write operation threshold associated with the non-volatile memory.

14. The non-transitory computer readable storage medium of claim 13, wherein determining the write operation threshold comprises:
  determining the write operation threshold based on information about a write limit associated with the non-volatile memory.

15. The non-transitory computer readable storage medium of claim 13, wherein determining the write operation threshold comprises:
  identifying a manufacturer or a type of the non-volatile memory;
  communicating the manufacturer or the type of the non-volatile memory to a database, wherein the database includes information regarding write operation thresholds associated with different types of non-volatile memories;
  when the database includes the write operation threshold associated with the non-volatile memory, obtaining, from the database, the write operation threshold; and
  when the database does not include the write operation threshold:
    generating an estimated write operation threshold based on analysis of manufacturing information associated with the non-volatile memory, and
    utilizing the estimated write operation threshold as the write operation threshold.

16. A wireless device configured to manage write operations issued to a non-volatile memory included in the wireless device, the wireless device comprising:
  the non-volatile memory; and
  at least one processor configured to cause the wireless device to carry out steps that include:
    monitoring one or more write operations issued to the non-volatile memory, wherein the one or more write operations are issued by a plurality of applications executing on the wireless device;
    determining that a number of write operations issued to the non-volatile memory is greater than or equal to a write operation threshold;
    communicating information associated with the one or more write operations to a remote server when the number of write operations is determined to be greater than or equal to the write operation threshold;
    receiving a response message from the remote server, wherein the response message is received at the wireless device and at one or more additional wireless devices, and wherein the response message includes:
  identifying information that identifies at least one application of the plurality of applications that is responsible for issuing the number of write operations that is greater than or equal to the write operation threshold, and is to be shut down, and
  executable instructions associated with the at least one application, wherein the executable instructions are to be carried out at the wireless device; and
in response to receiving the response message, identifying the at least one application that is to be shut down:
  isolating, from the plurality of applications, the at least one application that is responsible for issuing the number of write operations that is greater than or equal to the write operation threshold, and
  carrying out the executable instructions obtained from the response message, wherein the executable instructions when carried out prevent the at least one application from issuing additional write operations to the non-volatile memory.

17. The wireless device of claim 16, wherein the steps further include:
storing the information about each write operation that is issued to the non-volatile memory, wherein the information includes: an identifier for a particular application of the plurality of applications that issues the write operation, a timestamp associated with the write operation, a target memory address specified by the write operation, and data included in a body of the write operation.

18. The wireless device of claim 16, wherein the steps further include:
  compiling at least a portion of the information into a message;
  populating the message with information about the wireless device; and
  transmitting the message to the remote server.

19. The wireless device of claim 18, wherein the response message indicates that the one or more write operations should be limited from being issued to the non-volatile memory by:
  terminating the at least one application,
  locking the at least one application from issuing any write operations to the non-volatile memory, or
  locking the non-volatile memory from receiving write operations from any application.

20. The wireless device of claim 16, wherein the non-volatile memory is associated with a smart card included in the wireless device, and the one or more write operations are issued by the plurality of applications that are pre-loaded into the non-volatile memory of the smart card.

\* \* \* \* \*